(12) United States Patent
Lee et al.

(10) Patent No.: US 11,921,047 B2
(45) Date of Patent: Mar. 5, 2024

(54) RAMAN ANALYSIS APPARATUS CAPABLE OF REAL-TIME ANALYSIS UNDER ELEVATED TEMPERATURE AND PRESSURE CONDITIONS

(71) Applicant: Korea Institute Of Geoscience And Mineral Resources, Daejeon (KR)

(72) Inventors: Seungwoo Lee, Daejeon (KR); Gwang Mok Kim, Daejeon (KR); Jong Hwan Oh, Changwon-si (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 0 days.

(21) Appl. No.: 17/837,392

(22) Filed: Jun. 10, 2022

(65) Prior Publication Data

US 2023/0077298 A1  Mar. 9, 2023

(30) Foreign Application Priority Data

Sep. 6, 2021  (KR) .......................... 10-2021-0118331

(51) Int. Cl.
*G01N 21/65* (2006.01)
*G01N 21/75* (2006.01)

(52) U.S. Cl.
CPC ....... *G01N 21/65* (2013.01); *G01N 2021/754* (2013.01)

(58) Field of Classification Search
None
See application file for complete search history.

(56) References Cited

U.S. PATENT DOCUMENTS

2006/0045821 A1* 3/2006 McKelvy ............... G01N 21/05
422/130

FOREIGN PATENT DOCUMENTS

| CN | 111562217 A | * | 8/2020 |
| JP | 2009042038 A | * | 2/2009 |
| JP | 5120927 B2 | | 1/2013 |
| JP | 2019-109100 A | | 7/2019 |
| KR | 101855616 B1 | | 5/2018 |
| KR | 101897027 B1 | | 9/2018 |
| KR | 102246343 B1 | * | 4/2021 |
| KR | 102246343 B1 | | 4/2021 |

OTHER PUBLICATIONS

Korean Office Action dated Mar. 20, 2023 issued in corresponding Korean Appln. No. 10- 2021-0118331.

* cited by examiner

*Primary Examiner* — Tarifur R Chowdhury
*Assistant Examiner* — Roberto Fabian, Jr.
(74) *Attorney, Agent, or Firm* — Harness, Dickey & Pierce, P.L.C.

(57) ABSTRACT

Raman analysis apparatus capable of real-time Raman analysis while performing an experiment under elevated temperature and pressure conditions in surface or material property analysis of a powder solid sample, a single-crystal sample, a high-concentration liquid sample, or the like may be provided.

13 Claims, 4 Drawing Sheets

[FIG.1]
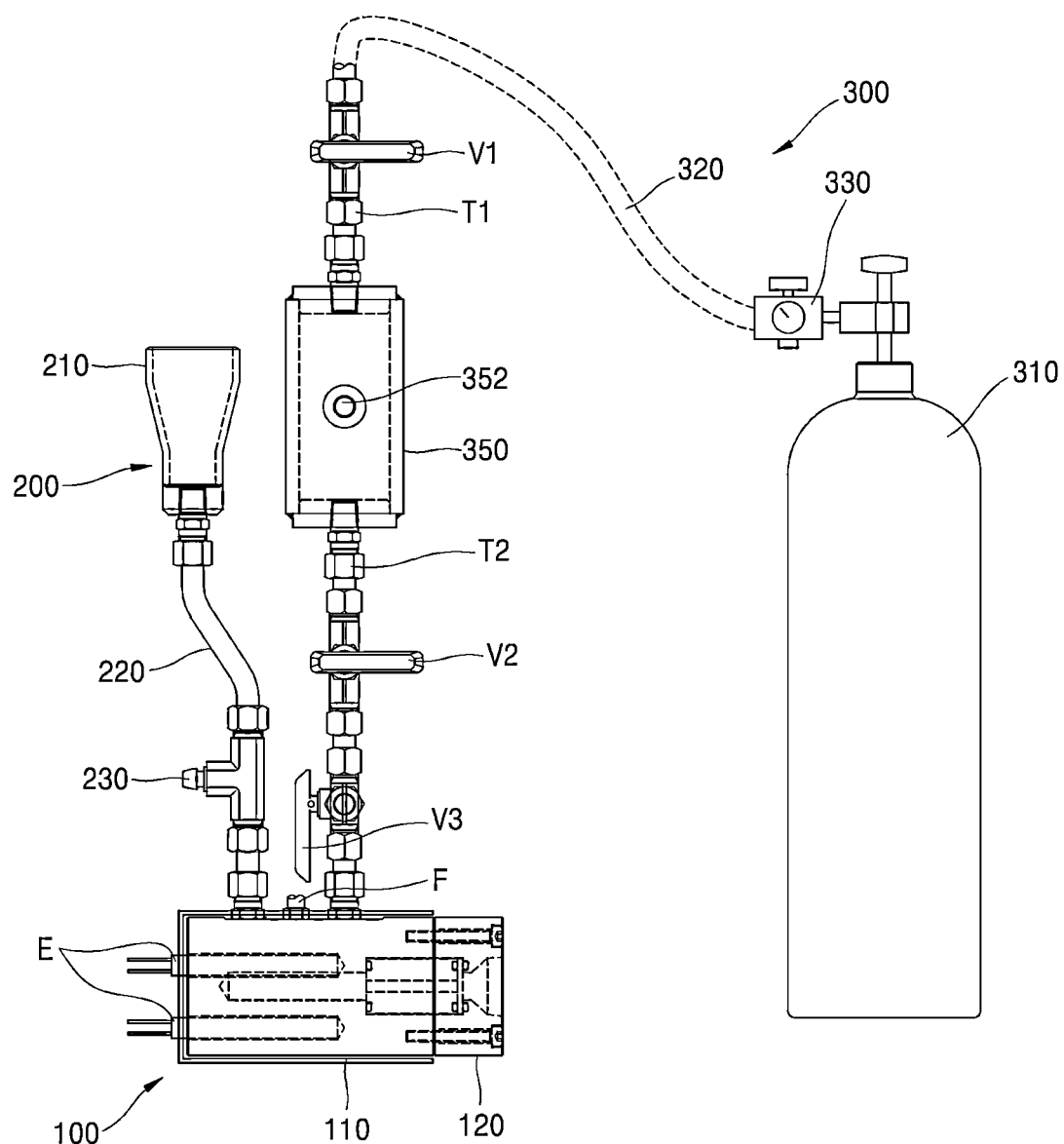

[FIG.2]
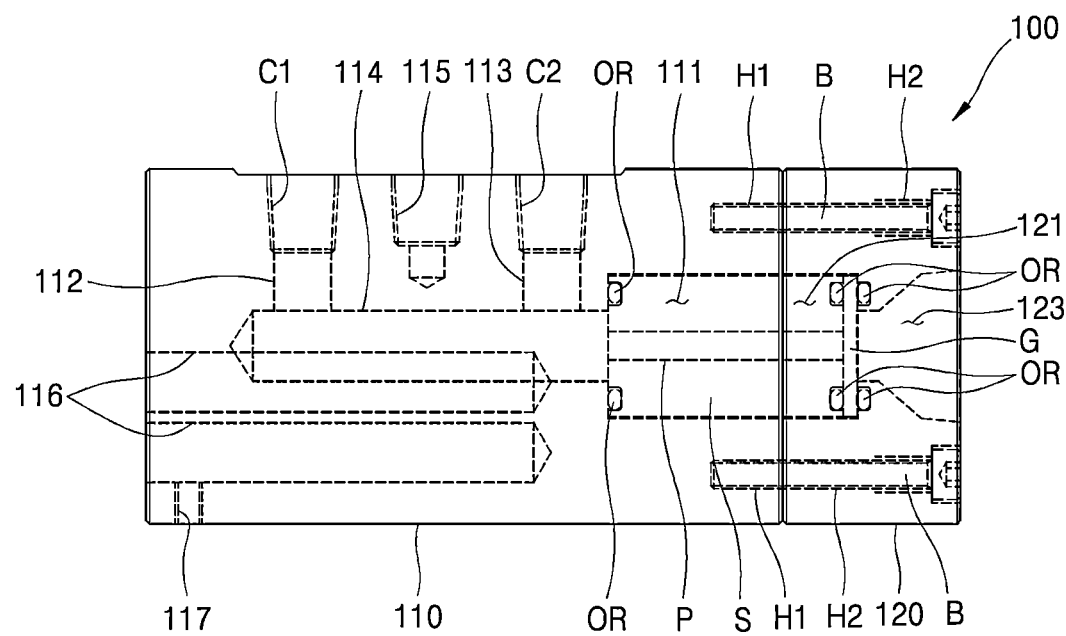

[FIG.3]
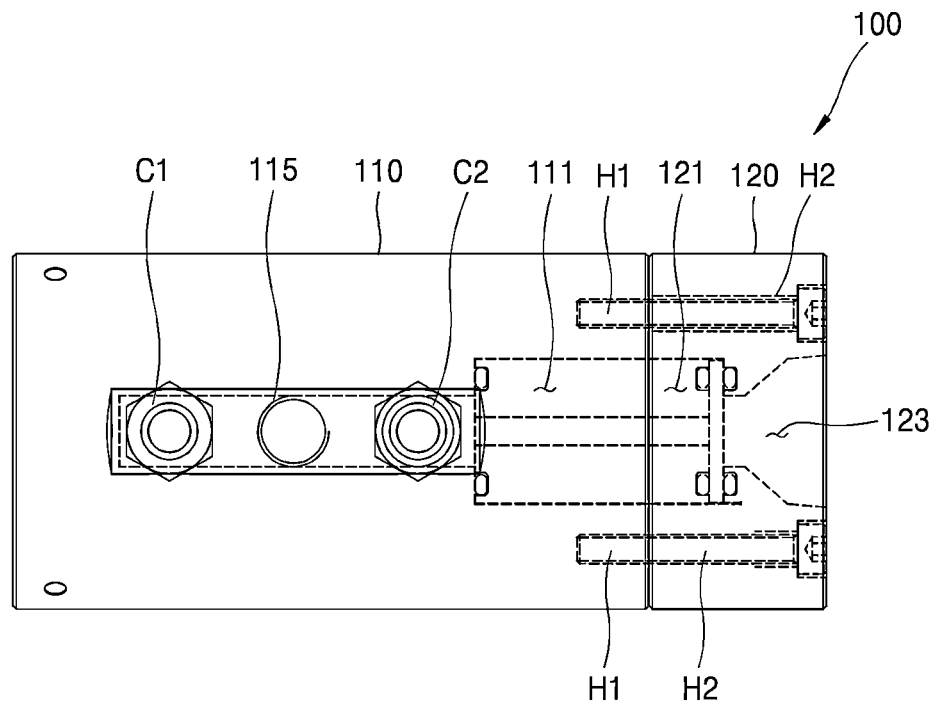
[FIG.4]
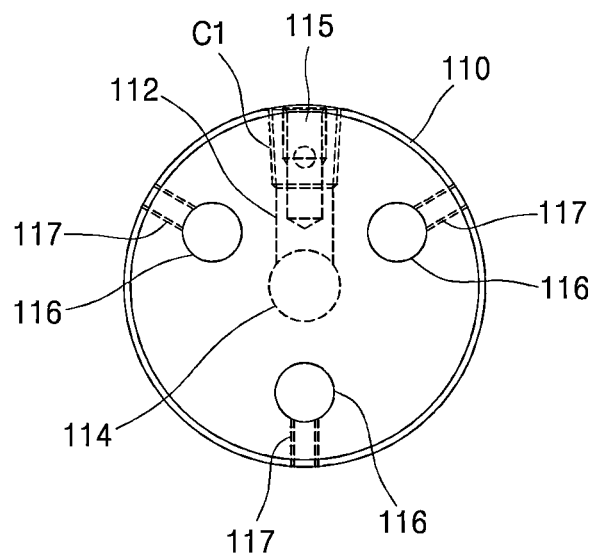

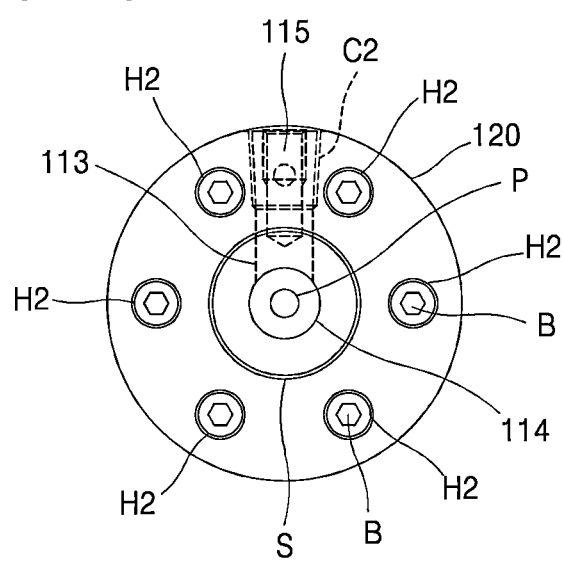
[FIG.5]

RAMAN ANALYSIS APPARATUS CAPABLE OF REAL-TIME ANALYSIS UNDER ELEVATED TEMPERATURE AND PRESSURE CONDITIONS

BACKGROUND OF THE INVENTION

Cross-Reference to Related Application(s)

This application claims the benefit of Korean Patent Application No. 10-2021-0118331, filed on Sep. 6, 2021, the disclosure of which is herein incorporated by reference in its entirety.

FIELD OF THE INVENTION

The present disclosure relates to a Raman analysis apparatus capable of real-time analysis under elevated temperature and pressure conditions. In detail, the present disclosure relates to a Raman analysis apparatus capable of real-time Raman analysis while performing an experiment under elevated temperature and pressure conditions in surface or material property analysis of a powder solid sample (a semiconductor, a macromolecule, etc.), a single-crystal sample, a high-concentration liquid sample, or the like.

DESCRIPTION OF THE RELATED ART

When the wavelength of scattered light by emitting monochromatic light to a material is observed, light of the specific wavelength of the material other than the monochromatic light is also observed in the scattered light.

This phenomenon is called Raman Effect, which was found in 1928 by C.V. Raman who is a physicist from India.

Raman found a spectrum having scattered light of benzene molecules as a photographic plate using a mercury lamp as a light source through analysis, which is the first Raman spectrum.

This phenomenon occurs because when light with a certain frequency comes in contact with a material, specific energy is absorbed, whereby the light becomes scattered light with a low frequency or becomes scattered light with a high frequency by emitting specific energy, in which the higher the symmetry of molecules, the higher the polarization.

Raman spectroscopy is an analysis technique using the degree of scattering of incident light by hitting a sample with a laser.

Raman scattered light is different in wavelength from incident light.

The energy difference between incident light and Raman scattered light is the same as energy for vibrating or rotating molecules.

The Raman spectrum appears as the difference of energy having different intensities, which shows a band showing a functional group.

The structure of a compound in a sample can be determined on the basis of this information.

Such Raman analysis equipment is widely used in surface or material property analysis of a powder solid sample (a semiconductor, a macromolecule, etc.) a single-crystal sample, a high-concentration liquid sample, or the like.

However, since Raman analysis using Raman analysis equipment is performed under a condition of room temperature and atmospheric pressure or is performed after a predetermined time passes after a high-temperature and high-pressure chemical reaction experiment in most cases in the related art, there is a problem that there is limitation in real-time analysis during a chemical reaction.

Accordingly, it is strongly required to develop an apparatus capable of real-time analysis while performing a chemical reaction experiment under elevated temperature and pressure conditions.

DOCUMENTS OF RELATED ART (Patent document 1) KR 10-2246343 B1 (published on 2021 Apr. 30)

SUMMARY OF THE INVENTION

The present disclosure has been made in an effort to solve various embodiments of the related art described above, and an objective of the present disclosure is to provide a Raman analysis apparatus capable of real-time Raman analysis while performing a chemical reaction experiment under elevated temperature and pressure conditions.

In order to achieve the objectives, a Raman analysis apparatus capable of real-time analysis while performing a chemical reaction experiment under elevated temperature and pressure conditions according to a first aspect of the present disclosure includes: a main body accommodating a sample block filled with a sample, having a channel formed such that a reaction solution is injected into the sample block at a predetermined pressure to react with the sample in the sample block, and having a window glass disposed on a side of the sample block such that the sample, which has reacted with the sample in the sample block, comes in contact with the window glass; a reaction solution supplier supplying a reaction solution to the channel of the main body; and a gas supplier adjusting a flow speed of the reaction solution in the channel by adjusting pressure in the channel by supply gas into the channel of the main body, in which a side of the main body is open and a Raman probe is disposed on the open side to be able to emit a Raman laser toward the window glass, a temperature elevation unit is installed at the main body to be able to elevate temperature.

The sample block may have a through-hole formed from one side to the other side thereof and the through-hole is filled with a sample.

The main body may include: a first body in which a first accommodation space is formed in a groove shape to accommodate a portion of the sample block, a main channel is formed to communicate with the through-hole so that a reaction solution and gas flow into the through-hole of the sample block accommodated in the first accommodation space, a reaction solution channel is formed to communicate with the main channel so that a reaction solution supplied from the reaction solution supplier flows through the reaction solution channel, and a gas channel is also formed to communicate with the main channel so that gas supplied from the gas supplier flows through the gas channel; and a second body in which a second accommodation space is formed on a surface facing the surface, on which the first accommodation space is formed, in a groove shape to accommodate the other portion of the sample block, the surface of the second surface which is positioned at an opposite side to an accommodation direction of the sample block is open, and the window glass is disposed on the open surface.

It is preferable that plurality of first fastening holes is formed on the side on which the first accommodation space of the first body, a plurality of second fastening holes is formed on the surface, which faces the surface on which the first accommodation space is formed, to corresponding to the first fastening holes, and fasteners fitted in the second fastening holes are fitted in the first fastening holes, thereby fastening the first body and the second body to each other.

A first coupling portion to which a supply tube of the reaction solution supplier is coupled may be formed at the first body, and a reaction solution supplied through the first coupling portion may flow into the reaction solution channel.

A second coupling portion to which a connection tube of the gas supplier is coupled may be formed at the first body, and a reaction solution supplied through the second coupling portion may flow into the gas channel.

A plurality of electric heater fitting holes, in which electric heater rods connected with an external power source and controller are fitted, may be formed in the first body.

A plurality of fixing holes, in which fixing members for fixing the electric heater rods fitted in the electric heater fitting holes are inserted, may be formed in the first body.

A thermocouple coupling portion, to which a thermocouple for measuring temperature of the first body heated and elevated in temperature by the electric heater rods and transmitting a signal to the controller is coupled, may be formed at the first body.

A Raman probe accommodation groove may be formed in the second body outside the window glass so that a Raman laser can be emitted toward the window glass.

The reaction solution supplier may include: a reaction solution feeing hopper keeping a reaction solution; a reaction solution supply tube of which one end is connected to the reaction solution feeding hopper and the other end is connected to the first coupling portion; and a reaction solution valve disposed substantially at a middle portion of the reaction solution supply tube, and opening and closing a reaction solution supply tube line.

The gas supplier may include: a gas tank keeping gas; a gas supply tube connected to the gas tank to be supplied with gas; one or more connection tubes of which one end is connected to the gas supply tube and the other end is coupled to the second coupling portion; and one or more gas valves installed substantially at a middle portion of the connection tube, and opening and closing a gas supply tube line.

It is preferable that a pressure adjuster is installed substantially at a middle portion of the gas supply tube.

The connection tube may include: a first connection tube connected to the gas supply tube and having a first gas valve installed therein; and a second connection tube connected to the second coupling portion and having a second gas valve installed therein, and a pressure accumulator may be connected between the first connection tube and the second connection tube.

It is preferable that pressure gauge is installed at the pressure accumulator.

A unit cell for Raman analysis according to a second aspect of the present disclosure includes: a first body in which a first accommodation space is formed in a groove shape to accommodate a portion of the sample block filled with a sample, a main channel is formed to communicate with the through-hole so that a reaction solution and gas flow into the through-hole of the sample block accommodated in the first accommodation space, a reaction solution channel is formed to communicate with the main channel so that a reaction solution supplied from the reaction solution supplier flows through the reaction solution channel, and a gas channel is also formed to communicate with the main channel so that gas supplied from the gas supplier flows through the gas channel; and a second body in which a second accommodation space is formed on a surface facing the surface, on which the first accommodation space is formed, in a groove shape to accommodate the other portion of the sample block, the surface of the second surface which is positioned at an opposite side to an accommodation direction of the sample block is open, and the window glass is disposed on the open surface.

Details of other embodiments are included in detailed description of the invention" and the accompanying "drawings".

The advantages and/or features of the present disclosure, and methods of achieving them will be clear by referring to the exemplary embodiments that will be described hereafter in detail with reference to the accompanying drawings.

However, it should be noted that the present disclosure is not limited to the configuration of each of embodiments to be described hereafter and may be implemented in various ways, and the exemplary embodiments described in the specification are provided to complete the description of the present disclosure and let those skilled in the art completely know the scope of the present disclosure and the present disclosure is defined by claims.

According to the summary, the present disclosure has the following effects.

According to the present disclosure, since it is possible to control the temperature of the main body accommodating the sample block filled with a sample, and the pressure in a channel formed therein, there is an effect that it is possible to perform real-time Raman analysis while performing a chemical reaction experiment under elevated temperature and pressure conditions.

BRIEF DESCRIPTION OF THE DRAWINGS

The above and other objectives, features and other advantages of the present invention will be more clearly understood from the following detailed description when taken in conjunction with the accompanying drawings, in which:

FIG. 1 is a view schematically showing the configuration of a Raman analysis apparatus capable of real-time analysis under elevated temperature and pressure conditions according to the present disclosure;

FIG. 2 is a view schematically showing a main body of the Raman analysis apparatus capable of real-time analysis under elevated temperature and pressure conditions according to the present disclosure;

FIG. 3 is a plan view of FIG. 2;
FIG. 4 is a left side view of FIG. 2; and
FIG. 5 is a right side view of FIG. 2.

DETAILED DESCRIPTION OF THE INVENTION

Hereafter, preferred embodiments of the present disclosure are described in detail with reference to the accompanying drawings.

Before describing the present disclosure in detail, terms or words used herein should not be construed as being limited to common or dictionary meanings, the concepts of various terms may be appropriately defined to the most optimally describe the invention by the inventor(s), and it should be noted that those terms or words should be construed as meanings and concepts corresponding to the technical spirit of the present disclosure.

That is, it should be noted that the terms used herein are used only to describing preferred embodiments of the present disclosure, not intending to limit the present disclosure in detail, and those terms are terms defined in consideration of various possibilities of the present disclosure.

Further, it should be noted that, in the specification, singular expression may include plural expression unless clearly stated in the sentences, and includes a singular meaning even if it is similarly expressed as a plural number.

It should be noted that when a component is described as "including" another component throughout the specification, the component may further include another component without another component excluded, unless specifically stated otherwise.

Further, it should be noted that when a component is described as "exists in" and "is connected to" another component, the component may be directly connected with another component, may be installed in contact with another component, or may be installed with a predetermined gap. When the component is installed with a gap, there may be a third component or means for fixing and connecting the component to another component, and the third component or means may not be described.

On the other hands, it should be understood that when a component is described as "directly connected" or "indirectly connected" to another component, it should be construed as there is no third component or means.

Similarly, the terms used herein to describe a relationship between elements, that is, "between", "directly between", "adjacent" or "directly adjacent" should be interpreted in the same manner as those described above.

Further, in the specification, it should be noted that terms such as "first side", "second side", "first", and "second", if used, are used to clearly discriminate one components from another component and the meaning of the corresponding component is not limited by the terms.

Further, terms related to positions such as "up", "down", "left", and "right", if used herein, should be construed as indicating relative positions of corresponding components in the corresponding figures and should not be construed as stating absolute positions unless the absolute positions of them are specified.

Further, it should be noted that, in the specification, terms such as "~part", "~er", "module", and "device", if used, mean a unit that can perform one or more functions or operations and may be implemented by hardware, software, or a combination of hardware and software.

Further, in the specification, when components are given reference numerals, the same reference numerals are given to same components even if they are shown in different figures, that is, same reference numerals indicate same components throughout the specification.

The size, position, coupling relationship, etc. of components of the present disclosure may be partially exaggerated or reduced in the accompanying drawings for the convenience of description in order to sufficiently and clearly transmit the spirit of the present disclosure, so the proportion or scale may not be precise.

Further, in the following description of the present disclosure, components that are determined to unclearly make the spirit of the present disclosure unclear, for example, well-known technology including the related art may not be described in detail.

FIG. 1 is a view schematically showing the configuration of a Raman analysis apparatus capable of real-time analysis under elevated temperature and pressure conditions according to the present disclosure.

A Raman analysis apparatus capable of real-time analysis under elevated temperature and pressure conditions according to the present disclosure includes a main body 100, a reaction solution supplier 200, and a gas supplier 300.

The main body 100 has a sample block S, which is filled with a sample such as a powder solid sample (a semiconductor, a macromolecule, etc.) a single-crystal sample, or a high-concentration liquid sample, therein and has a channel for injecting a reaction solution into the sample block S at a predetermined pressure such that the reaction solution reacts with the sample in the sample block S.

A window glass G is disposed on a side of the sample block S such that the sample, which has reacted with the reaction solution in the sample block, to come in contact with the window glass G.

A side of the main body 100 is open and a Raman probe is disposed to be able to emit a Raman laser toward the window glass G through the open side. A temperature elevation unit such as an electric heater rod E is installed in the main body to elevate temperature.

The sample block S may be formed in a cylindrical shape having a through-hole P from one side to the other side to be filled with a sample.

The main body 100 is described in detail below with respect to FIGS. 2 to 5.

The reaction solution supplier 200, which supplies a reaction solution into the channel of the main body 100, includes a reaction solution feeding hopper 210, a reaction solution supply tube 220, and a reaction solution valve 230.

The reaction solution feeding hopper 210 has a predetermined storage space for keeping a reaction solution and is open at the bottom, and a first end of the reaction solution supply tube 220 to be described below is connected thereto.

The one end of the reaction solution supply tube 220 is connected to the open bottom of the reaction solution feeding hopper 210 and the other end thereof is connected to a first coupling portion C1 formed at the main body 100.

The reaction solution valve 230 is installed substantially at the middle portion of the reaction solution supply tube 220 and opens/closes the tube line through which a reaction solution is supplied from the reaction solution feeding hopper 210 to the main body 100.

The gas supplier 300, which adjusts the flow speed of a reaction solution in a main channel 114 of the main body 100 to be described below by adjusting pressure in the main channel 114 by supplying gas into the main channel 114, includes a gas tank 310, a gas supply tube 320, a connection tubes T1, T2, and a gas valves V1, V2, V3.

The gas tank 310, which keeps gas such as carbon dioxide, is disposed at a side of the reaction solution supplier 200.

The gas supply tube 320 is made of a flexible material and is connected to the gas tank 310, thereby being supplied with gas.

One or more connection tubes are provided, and one end thereof is connected to the gas supply tube 320 and the other end thereof is coupled to a second coupling portion C2 formed at the main body 100.

The connection tube may include: a first connection tube T1 that is connected to the gas supply tube 320 and in which a first gas valve V1 is installed; and a second connection tube T2 that is connected to the second coupling portion C2 formed at the main body 100 and in which a second gas valve V2 is installed.

As shown in FIG. 1, a third gas valve V3 may be further installed in the second connection tube T2.

A pressure accumulator 350 may be connected between the first connection tube T1 and the second connection tube T2.

It is preferable that a pressure gauge 352 is installed at the pressure accumulator 350.

One or more gas valves V1, V2, and V3 are provided and installed substantially at the middle portion of the connection tubes T1 and T2, and open/close the tube line through which gas is supplied to the main channel 114 formed in the main body 100.

In this configuration, it is preferable that a pressure adjuster 330 is installed substantially at the middle portion of the gas supply tube 320.

FIG. 2 is a view schematically showing a main body of the Raman analysis apparatus capable of real-time analysis under elevated temperature and pressure conditions according to the present disclosure, FIG. 3 is a plan view of FIG. 2, FIG. 4 is a left side view of FIG. 2, and FIG. 5 is a right side view of FIG. 2.

The main body 100 is composed of a first body 110 and a second body 120 that are detachably coupled to each other.

The first body 110 has a first accommodation space 111 formed on a side in a groove shape corresponding to the external shape of the sample block S to accommodate a portion of the sample block S.

The main channel 114 is formed in the first body 110 to communicate with the through-hole P so that a reaction solution and gas flow into the through-hole P of the sample block S accommodated in the first accommodation space 111.

The diameter of the main channel 114 is larger than the diameter of the through-hole P formed in the sample block S and the sample block S is disposed in the first accommodation space 111 such that the longitudinal center lines of the main channel 114 and the through-hole P are aligned.

It is preferable that the diameter of the first accommodation space 111 is larger than the diameter of the main channel 114.

In the first body 110, a reaction solution channel 112 is formed to communicate with the main channel 114 so that a reaction solution supplied from the reaction solution supplier 200 flows through the reaction solution channel 112, and a gas channel 113 is formed to communicate with the main channel 114 so that gas supplied from the gas supplier 300 flows through the gas channel 113.

A plurality of first fastening holes H1 is formed on the side on which the first accommodation space 111 of the first body 110 and is aligned with second fastening holes H2 formed in the second body 120 to be described below.

The first coupling portion C1 to which the reaction solution supply tube 220 of the reaction solution supplier 200 is formed at the first body 110, so a reaction solution supplied through the first coupling portion C1 can flow into the reaction solution channel 112.

A second coupling portion C2 to which the connection tube of the gas supplier 300 is coupled is also formed at the first body 110, so gas supplied through the second coupling portion C2 can flow into the gas channel 113.

A plurality of electric heater fitting holes 116, in which electric heater rods E connected with external power source and controller (not shown) are fitted, is formed in the first body 110.

A plurality of fixing holes 117, in which fixing members such as a bolt for fixing the electric heater rods E fitted in the electric heater fitting holes 116 are inserted, may be formed in the first body 110.

A thermocouple coupling portion 115, to which a thermocouple F for measuring the temperature of the first body 110 heated and elevated in temperature by the electric heater rods E and transmitting a signal to the controller is coupled, may be formed at the first body 110.

It is preferable that an insulating tape layer is formed on the external surface of the first body 110.

The second body 120 has a second accommodation space 121 formed on a surface facing the surface, on which the first accommodation space 111 is formed, in a groove shape corresponding to the external shape of the sample block S to accommodate the other portion of the sample block S. The surface of the second accommodation space 121 which is positioned at the opposite side to the accommodation direction of the sample block S is open, and the window glass G made of sapphire is disposed on the open surface, thereby closing the open surface.

A plurality of second fastening holes H2 is formed on the surface, which faces the surface on which the first accommodation space 111 is formed, to corresponding to the first fastening holes H1, and fasteners B fitted in the second fastening holes H2, such as a bolt, are fitted in the first fastening holes H1, thereby fastening the first body 110 and the second body 120 to each other.

It is preferable that threads are formed on the internal circumferential surfaces of the first fastening holes H1 and the second fastening holes H2 to correspond to the threads formed on the external circumferential surfaces of the fasteners B.

A Raman probe accommodation groove 123 may be formed in the second body 120 outside the window glass G so that a Raman laser can be emitted toward the window glass G.

Sealing members such as an O-ring OR may be disposed between the front and rear surfaces of the window glass G and the open side of the second body 120 so that the window glass G can cover the portion being in contact with the main channel 114 in the first accommodation space 111 and the open side of the second body 120.

<Embodiment> Real-Time Measurement of Carbonate Production Reaction

Starting material: calcium hydroxide, distilled water+ carbon dioxide gas
  (1) Fill a sample block S with calcium hydroxide powder
  (2) Insert the sample block S filled with calcium hydroxide into the first accommodation space 111 and the second accommodation space 121 respectively formed in the first body 110 and the second body 120 of the main body 110, and then fit and fix bolts B into the first fastening holes H1 and the second fastening holes H2 including the window glass G.

In this state, there is no reaction because the sample block S is filled with only calcium hydroxide of the starting material.
  (3) Align a Raman probe (a device emitting a Raman laser) with the sapphire window glass G for real-time analysis
  (4) Set a target temperature of the electric heater rods E using the controller
  (5) Open all of the valves of the entire system, inject a reaction solution (an aqueous solution) into the reaction solution supply tube 220 through the reaction solution feeding hopper 210, and then close the reaction solution valve 230 when the solution starts to flow to a drain valve (not shown) on a side of the reaction solution supply tube 220.

In this state, the reaction solution permeates into the main channel 114 of the main body 110 and moves to the sapphire window glass G, whereby a reaction starts.

However, the reaction solution cannot quickly permeate when pressure is not applied, whereby it is possible to slow down the reaction.

That is, the reaction starts only when the reaction solution reaches the sapphire window glass G (the position of the surface being in contact with the Raman probe), and measurement is performed from that moment, so precise measurement is possible from the starting point in time of the reaction.

(6) Connect the first connection tube T1 connected to the gas tank 310 to the pressure accumulator 350, inject gas up to a target pressure (e.g., 10 bar), and then close the first gas valve V1 and the second gas valve V2 installed in the first connection tube T1 and the second connection tube T2.

An accurate target pressure is controlled by adjusting the first gas valve V1.

As pressure is applied to the main channel 114, the injected reaction solution (aqueous solution) comes in contact with the calcium hydroxide, whereby a reaction starts and an experimenter can perform real-time analysis under a desired pressurizing condition.

A unit cell for Raman analysis according to a second aspect of the present disclosure (which is the same configuration as the main body 100 described above and given the same reference numeral), which is adapted to the Raman analysis apparatus capable of real-time analysis under elevated temperature and pressure conditions described above, includes a first body 110 and a second body 120.

In the first body 110, a first accommodation space 111 is formed on a side in a groove shape to accommodate a portion of a sample block S filled with a sample and a main channel 114 is formed to communicate with a through-hole P so that a reaction solution and gas flow into the through-hole P of the sample block S accommodated in the first accommodation space 111.

Further, in the first body 110, a reaction solution channel 112 is formed to communicate with the main channel 114 so that a reaction solution supplied from the reaction solution supplier 200 flows through the reaction solution channel 112, and a gas channel 113 is also formed to communicate with the main channel 114 so that gas supplied from the gas supplier 300 flows through the gas channel 113.

A second accommodation space 121 is formed on a side facing the side in the second body 120, on which the first accommodation space 111 is formed, in a groove shape corresponding to the external shape of the sample block S to accommodate the other portion of the sample block S. Further, in the second body 120, the surface positioned opposite to the accommodation direction of the sample block S in the second accommodation space 121 is open.

A sapphire window glass G is disposed on the open surface (positioned opposite to the accommodation direction of the sample block S) of the second body 120, thereby closing the open portion.

Various preferred embodiments of the present disclosure were described above through some examples, but the various embodiments described in "detailed description of the invention" are only examples and it would be clearly understood by those skilled in the art the present disclosure may be changed in various ways or equivalently implemented from the above description.

Further, it should be noted that since the present disclosure may be implemented in other various ways, the present disclosure is not limited to the above description, the above description is provided to completely explain the present disclosure and provided only to completely inform those skilled in the art of the range of the present disclosure, and the present disclosure is defined by only claims.

What is claimed is:

1. A Raman analysis apparatus capable of real-time analysis while performing a chemical reaction experiment under elevated temperature and pressure conditions, the Raman analysis apparatus comprising:

a main body configured to accommodate a sample block filled with a sample, the main body including a channel and a window glass, the channel configured to inject a reaction solution into the sample block at a predetermined pressure such that the reaction solution reacts with the sample in the sample block, and the window glass on a side of the sample block such that the sample, which has reacted with the sample in the sample block, comes in contact with the window glass;

a reaction solution supplier configured to supply the reaction solution to the channel of the main body; and a gas supplier configured to adjust a flow speed of the reaction solution in the channel by adjusting pressure in the channel by supply gas into the channel of the main body, wherein a Raman probe is on an open side of the main body and is configured to emit a Raman laser toward the window glass, and a temperature elevation unit is at the main body and is configured to elevate temperature, wherein the sample block has a through-hole, the through-hole extending from one side to an opposite side of the sample block and filled with the sample, and wherein the main body includes, a first body including a first accommodation space, a main channel, a reaction solution channel, a gas channel, the first accommodation space having a groove shape and configured to accommodate a portion of the sample block, the main channel configured to communicate with the through-hole so that a reaction solution and gas flow into the through-hole of the sample block accommodated in the first accommodation space, the reaction solution channel configured to communicate with the main channel so that a reaction solution supplied from the reaction solution supplier flows through the reaction solution channel, and the gas channel configured to communicate with the main channel so that gas supplied from the gas supplier flows through the gas channel, and a second body including a second accommodation space and the window glass, the second accommodation space being on a first surface of the second body facing a surface of the first body, on which the first accommodation space is provided, and having a groove shape to accommodate the other portion of the sample block, and the window glass being in an opening of an second surface, the second surface of the second body being opposite to the first surface of the second body in an accommodation direction of the sample block.

2. The Raman analysis apparatus of claim 1, wherein the first body includes a plurality of first fastening holes on the first surface, the second body includes a plurality of second fastening holes on the first surface and corresponding to the first fastening holes, and fasteners fitted in the second fastening holes are configured to be fitted in the first fastening holes, thereby fastening the first body and the second body to each other.

3. The Raman analysis apparatus of claim 1, wherein the first body includes a first coupling portion coupled to a supply tube of the reaction solution supplier such that the reaction solution supplied through the first coupling portion flows into the reaction solution channel.

4. The Raman analysis apparatus of claim 1, wherein the first body include a second coupling portion coupled to a connection tube of the gas supplier such that the reaction solution supplied through the second coupling portion flows into the gas channel.

5. The Raman analysis apparatus of claim 1, wherein the first body includes a plurality of electric heater fitting holes, in which electric heater rods connected with an external power source and controller are fitted.

6. The Raman analysis apparatus of claim 5, wherein the first body includes a plurality of fixing holes, in which fixing members configured to fix the electric heater rods fitted in the electric heater fitting holes are inserted.

7. The Raman analysis apparatus of claim 5, further comprising:
a thermocouple coupling portion at the first body; and
a thermocouple coupled to the thermocouple coupling portion, the thermocouple configured to measure temperature of the first body heated and elevated in temperature by the electric heater rods and transmit a signal to the controller.

8. The Raman analysis apparatus of claim 1, wherein the second body including a Raman probe accommodation groove, which is outside the window glass, so that the Raman laser can be emitted toward the window glass.

9. The Raman analysis apparatus of claim 3, wherein the reaction solution supplier includes:
a reaction solution feeding hopper configured to keep the reaction solution;
a reaction solution supply tube of which one end is connected to the reaction solution feeding hopper and an opposite end is connected to the first coupling portion; and
a reaction solution valve at a middle portion of the reaction solution supply tube, and configured to open and close a reaction solution supply tube.

10. The Raman analysis apparatus of claim 4, wherein the gas supplier includes:
a gas tank configured to keep the gas;
a gas supply tube connected to the gas tank to be supplied with the gas;
one or more connection tubes of which one end is connected to the gas supply tube and another end is coupled to the second coupling portion; and
one or more gas valves at a middle portion of the connection tube, and configured to open and close the gas supply tube.

11. The Raman analysis apparatus of claim 10, wherein a pressure adjuster is at a middle portion of the gas supply tube.

12. The Raman analysis apparatus of claim 10, wherein the one or more connection tubes include:
a first connection tube connected to the gas supply tube and having a first gas valve installed therein; and
a second connection tube connected to the second coupling portion and having a second gas valve installed therein, and
a pressure accumulator is connected between the first connection tube and the second connection tube.

13. The Raman analysis apparatus of claim 12, wherein a pressure gauge is installed at the pressure accumulator.

* * * * *